Oct. 13, 1970  P. A. MERCER  3,534,386

ELECTRON BEAM WELDING

Filed April 23, 1968  2 Sheets-Sheet 1

Inventor
Peter A. Mercer
By
Kenyon, Palmer & Estabrook
Attorneys

United States Patent Office 3,534,386
Patented Oct. 13, 1970

3,534,386
ELECTRON BEAM WELDING
Peter A. Mercer, Sawston, England, assignor to The Welding Institute, Abington, Cambridge, England, a British body corporate
Filed Apr. 23, 1968, Ser. No. 723,528
Claims priority, application Great Britain, Nov. 20, 1967, 52,726/67
Int. Cl. B23k 9/00
U.S. Cl. 219—121      3 Claims

ABSTRACT OF THE DISCLOSURE

In an electron beam welding operation, the electron beam is given a periodic deflection away from its welding position to cause it to cross a stationary probe, the period of deflection being small in comparison with the interval between deflections. An electric signal derived from the probe represents the beam energy distribution and is used to provide a focus indication or to actuate automatic focusing means.

---

In electron beam welding, the beam characteristics which are of importance are beam diameter at focus, beam energy density distribution and the rate of convergence of the electron beam. Because of the high energy densities involved it is difficult to measure directly any of the characteristics of the electron beams and it is not possible to reduce the beam energy density to measure the other characteristics because these will alter as a consequence of the power change.

In order to be able to produce and reproduce the optimum weld it is necessary to focus the electron beam accurately to a predetermined position within the material to be welded. It is customary for focusing to be carried out visually by the operator, using either the workpiece itself or a comparable metal member, since the object at the focus will be subjected to intense heating. The operator observes through a telescopic optical system the point at which the electron beam strikes the workpiece or other metal member and adjusts the focus current until the smallest bright spot is seen in the field of view. However, the assessment of the size of the boiling metal spot is not easy even when, to avoid formation of a large weld pool by heat conduction, the focusing block is moved continuously. Consequently, the quality of consecutive welds is unlikely to be consistent and will vary from one operator to another. In addition, the operator has no means of telling whether the machine is performing as well as on a previous occasion and therefore although he may obtain the best focus he cannot be sure that the beam characteristics, including its diameter at focus, are the same as they were on the previous occasion.

A further difficulty is that the achievement of a focus point at the surface of the metal workpiece does not necessarily lead to the most desirable weld contour.

Consequently, although electron beam welding has many attractive features and is capable of producing welds of vary high quality, the optimum working conditions can only be determined and maintained with practical trials carried out by skilled operators.

In application Ser. No. 723,435, filed Apr. 23, 1968, in the names of Allan Sanderson and Martin James Adams, also assigned to the Welding Institute, there is disclosed and claimed electron beam welding apparatus in which a thin metallic probe and the electron beam generated within the apparatus are given a relative motion of a cyclic nature such that the probe is passed through the beam in each cycle. An electric signal derived from the probe or from a metallic member positioned to receive the beam after it has passed the probe, is used to operate an indicator or to actuate automatic focusing means. The electric signal represents the energy distribution in the beam at the level at which the intersection with the probe takes place. In the said application, the probe may be rotated to achieve the relative motion between itself and the beam or the beam may be given a rotary or oscillatory motion to cross the probe.

The present invention is concerned with electron beam welding apparatus including a stationary probe from which the energy-distribution signal is collected. According to the invention, in the course of a beam welding operation the electron beam is given a deflection to cause it to cross the probe at intervals, the period of deflection being small in comparison with the interval. The resulting signal is used either to provide a focus indication, for example on a cathode ray oscilloscope, or to actuate focusing control means which adjusts the focus current whenever there is a departure from the required focus level.

When the energy distribution signal is displayed on an oscilloscope, it is advantageous to use a multiple probe having arms spaced in the direction of travel of the electron beam so that different arms will cut the beam at different points and the electrical signals from the different arms, when displayed on an oscilloscope, will give traces which will indicate by their amplitude and width the changing beam intensity and width as the beam passes from the first probe in its path to the last. These probes are preferably also displaced with respect to one another in the direction of the relative motion of the probe and beam to cause a time displacement in the signals which they produce.

The oscilloscope traces derived from any probe intersecting the electrons represents an approximate energy density profile of the beam at the point of intersection and by adjusting focus current on the electron beam machine it is possible to obtain a desired beam energy distribution. At focus, the optimum energy distribution is that which has the greatest amplitude and smallest beam width.

An alternative to the oscilloscope method of presenting the probe signal giving high sensitivity is the use of a peak sensing voltmeter. Automatic control of focus coil current may be obtained using servo-mechanism techniques by sensing a maximum from the voltmeter output or obtaining null balance with a reference voltage. As an example, a servo-mechanism may adjust the focus current to try to maintain a given pulse width or may adjust the focus current continuously in a direction such as to increase the amplitude of the signal from the central probe, in the triple-arm probe arrangement described above, relative to the amplitudes of the signals from the outer probes.

It may in some cases be advantageous to arrange for probe arms to be passed through the electron beam in directions such that the resulting signals from these arms indicate the beam energy density distribution in two mutually perpendicular directions in the plane in which the arms sweep through the beam.

The probe cannot be arranged at the focus of the beam during continuous monitoring operations, unless the workpiece is of small width, when the beam can be flicked clear of the workpiece to cross the probe at the focus level. However, as the probe is stationary it can be arranged quite close to the surface of the workpiece and because the angle of convergence of the beam is very small it will still pass through a beam of narrow width when the latter is correctly focused. The width of the resulting pulse from the probe can be correlated with the distance of the focus below the probe level.

In order that the invention may be better understood, some examples of apparatus embodying the invention will now be described with reference to the accompanying drawings, in which:

FIG. 1 illustrates diagrammatically an arrangement employing a stationary probe and a periodically deflected electron beam;

FIG. 2 illustates the kind of trace which is obtained on an oscilloscope connected to probe assemblies of the kind shown in FIG. 1;

Figure 1:
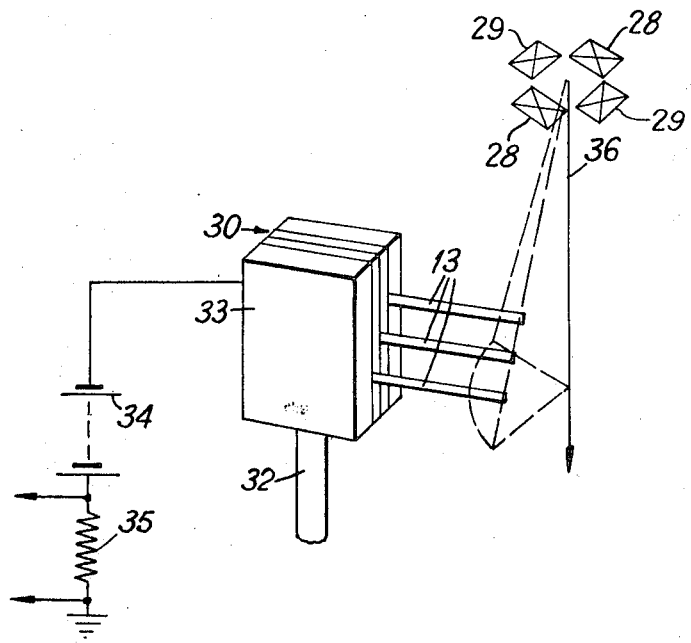

In the arrangement shown in FIG. 1, the probe assembly 30 is stationary and is mounted on an insulator 32. Three probes 13 are laterally and vertically displaced with respect to one another. In this case, an electron beam represented by the line 36 is given a brief periodic deflection during an electron beam welding operation such that it moves away from the welding axis and sweeps out a path in the shape of a quadrant in the course of which it intersects the probes once. The probes, which are also mounted in a metal block 33 constituting a heat sink, are electrically connected to earth through a biasing battery 34 and a resistor 35 and the voltage across the resistor is taken to the Y deflection plates of the oscilloscope. In this case, the sweep trigger signal is conveniently derived from the source of deflection signals for the beam.

Figure 2:
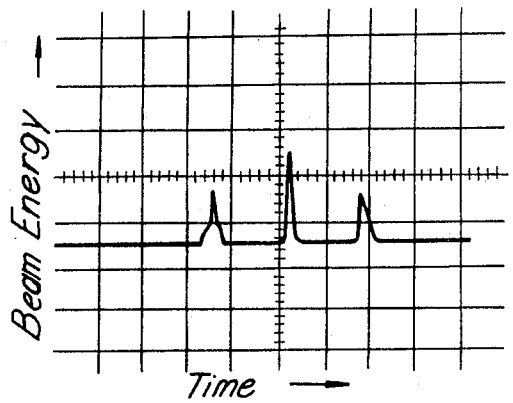

A typical trace obtained from a triple arm probe assembly, of the kind shown in FIG. 1 is illustrated in FIG. 2. In FIG. 2, the X axis represents time and the Y axis integrated current density. The width of each pulse at its base represents the beam diameter. It will be seen that the trace shown in FIG. 2 represents a good focus in that the signal from the central probe indicates a high energy density and a small beam diameter.

Figure 3:
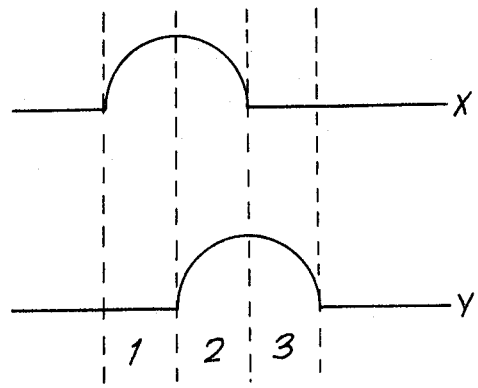
FIG. 3 shows deflection waveforms for giving the electron beam a periodic monitoring deflection.

FIG. 3 shows the X and Y deflection waveforms which we use to achieve the periodic quadrant deflection during a welding operation.

Figure 4:
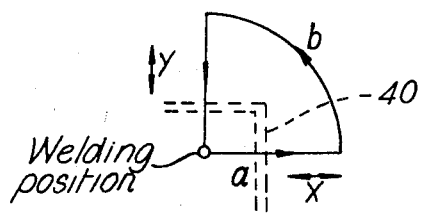
FIG. 4 shows the beam movement obtained by the deflection waveforms of FIG. 3, in relation to a right-angled probe.

Each of the X and Y deflection time bases of the electron beam welding equipment is periodically given a unidirectional pulse of semi-sinusoidal form, the two pulses overlapping by one half of their duration. The result of this, as shown in FIG. 4, is that on the occurrence of the first pulse the beam sweeps out in the X direction along a path $a$, the point of maximum deflection occurring at the peak of the pulse. At this point the Y deflection pulse commences so that during the next half pulse period the deflections are going on simultaneously, the Y deflection on the rising sinusoidal waveform and the X deflection on the falling sinusoidal waveform. As a consequence, the beam sweeps round its welding position in an arc $b$ to a point at which there is no X deflection but maximum Y deflection. Then in the next half pulse period the Y deflecion decreases sinusoidally and the beam returns along path $c$ to the welding position. The probe can be located anywhere in the path of moveemnt of the beam during this deflection. In the case of a linear probe of the kind shown in FIG. 1, it is preferably arranged that the beam intercepts the probe whilst moving along its arcuate path, since in this way it will be ensured that the intersections take place at constant velocity. However, for some purposes, it is desirable to obtain an indication of the beam energy distribution in two mutually perpendicular directions, and for this purpose a right-angled probe 40 can be used, as shown in FIG. 4, or an assembly of right-angled probes. The probe 40 is then so positioned that one section of the probe is traversed by the beam in the first half-pulse period of the three half-pulse periods constituting the total deflection and the other section of the probe is traversed by the beam during the third half-pulse period.

The periodic monitoring deflection of the probe also lengthens the life of the probe since it has to absorb very little heat. This applies to a straight line deflection (the beam crossing the probe on the outward and inward journeys every $n$th cycle of the supply) as well as to the quadrant deflection in which the beam may only cross the probe once or at two different points, thus improving still further the life of the probe. Thus in this example the periodic monitoring deflection occupies one quadrant of the space around the welding axis of the beam. If desired, other probes at different heights can be used in other quadrants and the beam can be selectively switched, in its periodic monitoring deflections, to any of these quadrants. Since each probe arm is at the junction of two quadrants, it is sometimes possible to use a single probe arm for signals from either of two quadrants.

It will be appreciated that the deflection does not necessarily have the shape of a quadrant. As indicated above, it can be a straight line deflection, or alternatively it can be a semi-circle or of any desired shape and different probes can be switched in and out of service by using different deflection waveforms.

Such a probe may be arranged quite close to the surface of the workpiece and because the angle of convergence of the beam is very small it will still pass through a beam of narrow width when the latter is correctly focused. If the workpiece is of variable height, that is to say of variable distance from the electrode gun, the probe may be moved to follow the contours of the workpiece and thus a continuously variable focus may be obtained. Alternatively, the reference beam width for the probe may be varied to give the same effect. This may be achieved by electrically or mechanically sensing the contours of the workpiece or by separate programming. For step contours, changes of focus may be achieved with separate fixed probes at different levels.

The signals for the deflection of the electron beam can easily be achieved by generating two sinusoidal waveforms which are phase-displaced by 90° and gating one half-cycle for each of these waveforms out of every 50 cycles. The electron beam is thus away from its welding position for less than $\frac{1}{50}$ of the total time. A third gating circuit operating one in every 50 cycles may be used to derive from the alternating waveforms a reference signal for the oscilloscope sweep.

The width which the probe presents to the beam should be appreciably smaller than the effective electron beam diameter; given this condition, the peak amplitude and overall duration of the signal from the probe are both very sensitive to small changes in energy density distribution and beam diameter. A ribbon presenting its edge to the beam, is able to withstand electron bombardment for longer times than the same thickness of wire, because of its greater cross-sectional area and hence greater thermal conductance and higher thermal capacity.

The preferred material of the probbe is tungsten, since it has a high melting point and a high boiling point combined with a good thermal conductivity. In addition, it is readily available in the form of fine wire and ribbon. Copper and platinum are other materials which can be used but are less suitable above moderate beam powers.

A bias may be applied to the probe to suppress secondary emission from the probe as a consequence of its bombardment by the electron beam. If the beam diameter or beam current is fluctuating (say, in sympathy with a machine supply ripple frequency) then the probe device will detect this ripple and show its effect on the beam. For this the rate of oscillation of the probe with respect to the beam is arranged to be slightly different to the expected machine ripple frequency.

Figure 5:
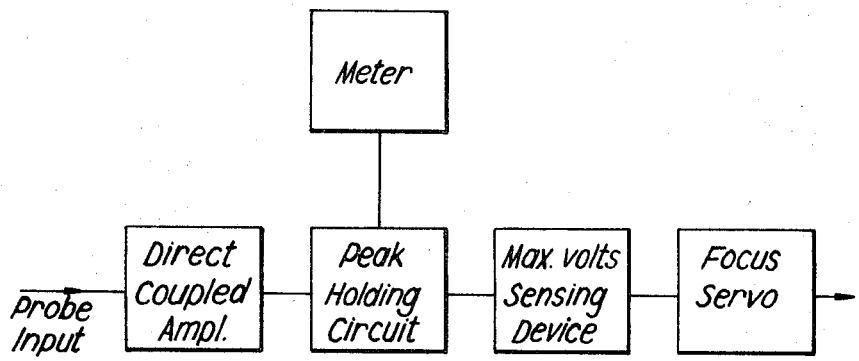
FIG. 5 is a block diagram of an automatic focusing circuit.

Automatic control of focus can be achieved by the circuit shown diagrammatically in FIG. 5. The probe input is applied through a direct-coupled amplifier to a peak-holding circuit, for example a diode-capacitor circuit. The peak voltage at each sweep is applied to a maximum voltage-sensing device which senses a change of polarity in the slope of the signal resulting from the succession of peak voltages, for example by determining the first and second derivatives of the signal. Whenever the slope changes in polarity a signal is applied to a focus servo to cause it to adjust coil current in a sense such as to reverse the sense of change of focus. Thus the beam focus continuously oscillates about its desired position. As soon as it moves away from focus in a first sense the direction of change is reversed and as soon as it has passed through focus and moves away from focus in the opposite sense, the direction of change is again reversed. Control systems of this kind have been described in chapter 15 (Optimalising Control) of "Engineering Cybenetics" by H. S. Tsien, published by McGraw-Hill in 1954; and in an article entitled "Peak Holding Optimalising Servo" by R. L. Maybach in "Instrument and Control Systems," vol. 36, No. 10 (October 1963), p. 76. In the example shown a meter provides a visible indication of the peak values.

In an alternative automatic focusing system the output of the peak holding circuit is applied to a null balance servo fed with a reference voltage and the null balance servo controls the focus coil current. This system can be used when the beam is sensed at a point above the desired focus, the reference voltage being correlated to the distance of the probe above the workpiece.

Using the invention, the beam focus can be determined with good precision and a high depth/width ratio for the molten metal can be obtained; this is found to be desirable for deep penetration characteristics. A given amount of defocusing can be introduced if required. Soft focus beams are desirable for a smoothing or cosmetic path after the main welding path and can also be used for some joint configurations and thin sheet applications.

I claim:
1. A method of electron beam welding, comprising:
   directing an electron beam of welding intensity along a path to a workpiece to heat said workpiece where the weld is required;
   positioning a metallic probe out of but adjacent said path of the electron beam;
   deflecting the electron beam at intervals during the said heating of the workpiece to cause the beam to cross the probe, the period of deflection being small in comparison with the said intervals;
   and deriving from said probe an electric signal indicative of the beam focus; whereby the focus is monitored at intervals during the progress of the electron beam welding operation.

2. A method as defined by claim 1, in which the probe is shaped to have portions extending in different directions and in which the electron beam, when deflected, follows a path which traverses each of the said portions of the probe, whereby the resulting pulses show the beam energy distribution in different directions of the cross-section of the beam.

3. A method as defined by claim 2, in which the probe has two arms at right angles to each other and in which two half-cycles of alternating current, 90° out of phase with each other, are used to deflect the beam out of the path and into a quadrant shaped path.

References Cited
UNITED STATES PATENTS

| | | |
|---|---|---|
| 3,140,379 | 7/1964 | Schleich et al. |
| 3,146,335 | 8/1964 | Samuelson. |
| 3,148,265 | 9/1964 | Hansen. |
| 3,207,982 | 9/1965 | Rose. |
| 3,268,812 | 8/1966 | Meyer et al. |
| 3,326,176 | 6/1967 | Sibley _____ 219—121 |
| 3,371,274 | 2/1968 | Davey _____ 219—121 |
| 3,408,474 | 10/1968 | Downing _____ 219—121 |

JOSEPH V. TRUHE, Primary Examiner

L. A. ROUSE, Assistant Examiner